United States Patent
Arima

(10) Patent No.: US 7,418,005 B2
(45) Date of Patent: Aug. 26, 2008

(54) BUS OPTIMIZING METHOD AND COMMUNICATION NODE

(75) Inventor: Yukio Arima, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1048 days.

(21) Appl. No.: 10/200,428

(22) Filed: Jul. 23, 2002

(65) Prior Publication Data

US 2003/0021235 A1 Jan. 30, 2003

(30) Foreign Application Priority Data

Jul. 24, 2001 (JP) ............... 2001-222940

(51) Int. Cl.
*H04L 12/43* (2006.01)
(52) U.S. Cl. ..................... 370/461; 370/462
(58) Field of Classification Search ............. 370/232, 370/241, 241.1, 244, 245, 248, 249, 250, 370/252, 461–462; 709/224, 232; 710/104, 710/107, 108
See application file for complete search history.

(56) References Cited

U.S. PATENT DOCUMENTS

| | | | |
|---|---|---|---|
| 5,784,557 A | 7/1998 | Oprescu | 395/200.5 |
| 6,496,485 B1 * | 12/2002 | Le | 370/461 |
| 6,587,904 B1 * | 7/2003 | Hauck et al. | 710/107 |
| 6,628,607 B1 * | 9/2003 | Hauck et al. | 370/216 |
| 6,735,215 B1 * | 5/2004 | Cao | 370/437 |
| 7,039,014 B1 * | 5/2006 | Krishnamurthy et al. | 370/244 |
| 7,058,024 B1 * | 6/2006 | Koay | 370/255 |

FOREIGN PATENT DOCUMENTS

| | | |
|---|---|---|
| WO | 94/15303 | 7/1994 |
| WO | 94/15304 | 7/1994 |

OTHER PUBLICATIONS

"*P1394b Draft Standard for a High Performance Serial Bus (Supplement)*" The Institute of Electrical and Electronics Engineers, Inc., Feb. 25, 2000, pp. 180-183 and pp. 239-358.

* cited by examiner

*Primary Examiner*—Firmin Backer
*Assistant Examiner*—Phuongchau B Nguyen
(74) *Attorney, Agent, or Firm*—McDermott Will & Emery LLP

(57) ABSTRACT

When a signal cable is connected between communication nodes 0, 1 which comply with a communication protocol that inhibits loop connection, communication node 0 detecting connection of the signal cable transmits a loop test signal LT having information of a port where connection was detected (e.g., information of a transfer rate between ports). In response to the loop test signal LT, a communication node 2 adds information of its own port that received the loop test signal LT, that is, P(2, 1), to the received loop test signal LT, and repeats the loop test signal LT. Similarly, communication node 1 adds information of its own port that received the loop test signal LT, that is, P(1, 0), to the loop test signal LT. Communication node 0 specifies a suitable disconnection point of a loop (e.g., a port having a low transfer rate between ports) based on the port information thus accumulated. Accordingly, even if a loop is formed accidentally, the disconnection point of the loop can be specified in view of the signal transfer efficiency on the network, and the port corresponding to the disconnection point can be logically disabled.

4 Claims, 7 Drawing Sheets

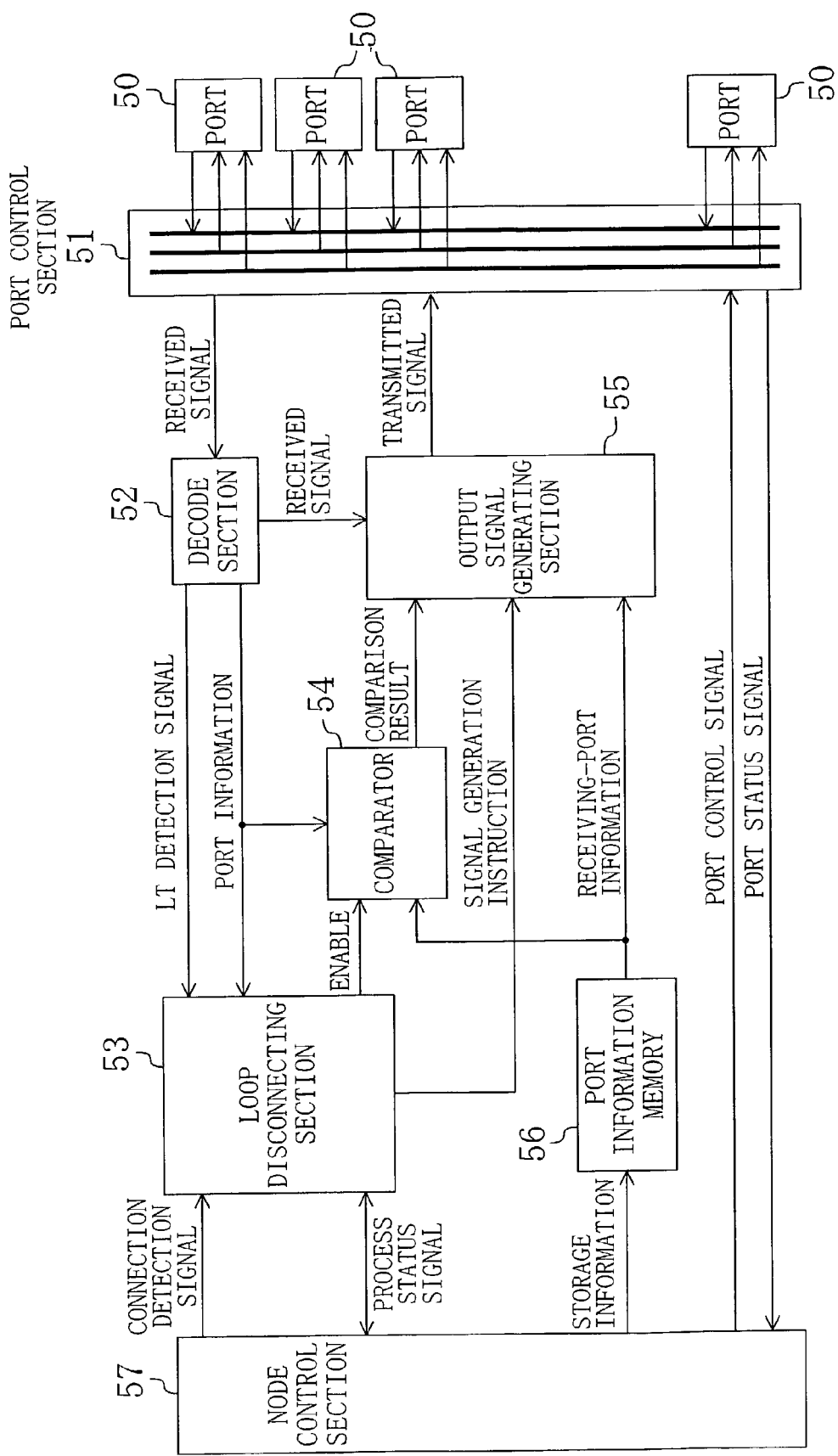

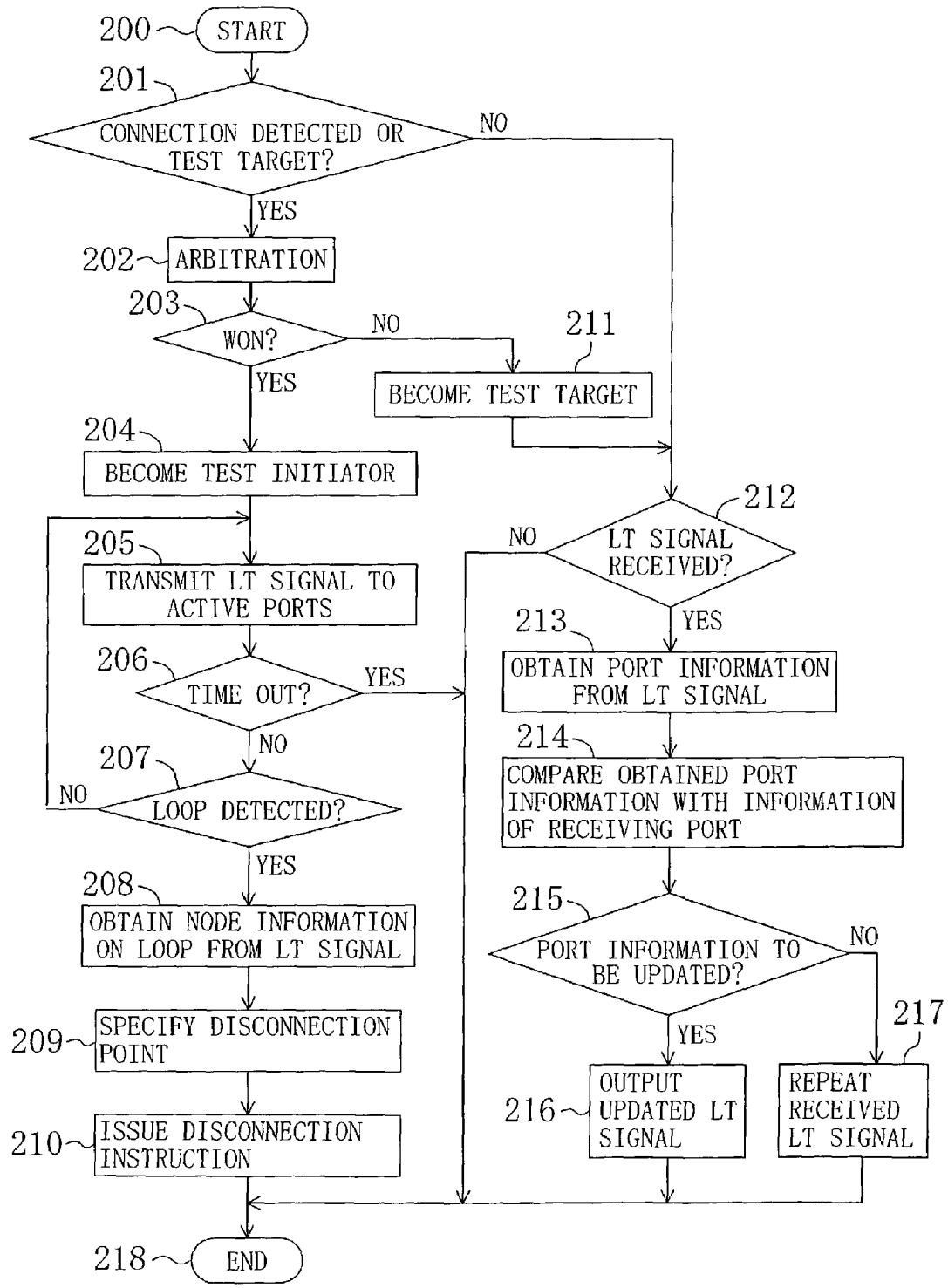

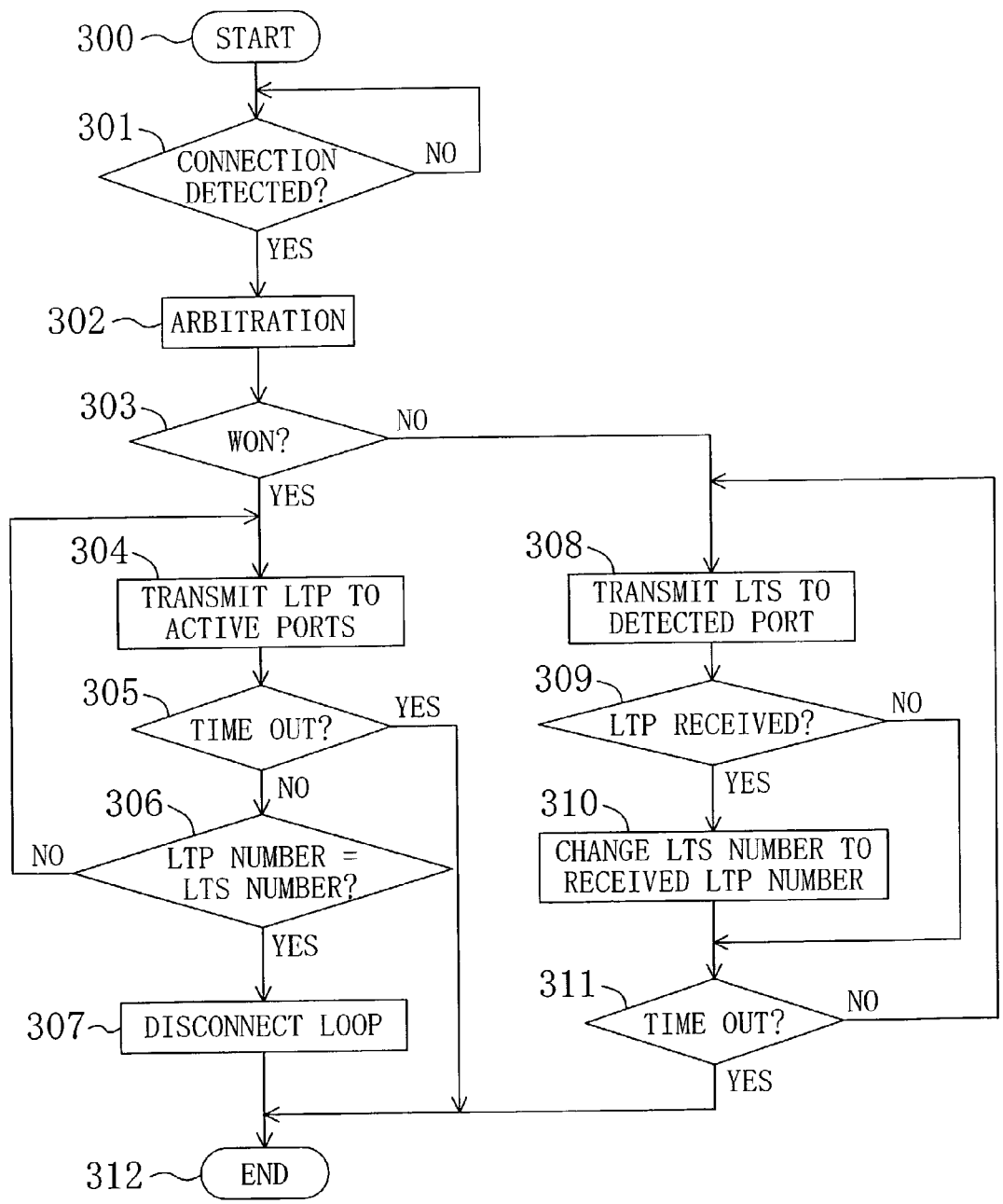

BUS OPTIMIZING METHOD AND COMMUNICATION NODE

BACKGROUND OF THE INVENTION

The present invention generally relates to a communication node forming a computer network. More particularly, the present invention relates to a bus optimizing method used on a network connecting ports of a communication node to ports of other communication nodes on a one-to-one basis and having an acyclic directed graph, for logically disconnecting a loop accidentally formed on the network in order to disable the loop.

Conventionally, a tree-type network, a daisy-chain type network and the like are known as a network of the type connecting ports of a communication node to ports of other communication nodes on a one-to-one basis. One of networks using such a connection state of communication nodes is IEEE Standard (1394 Standard for a High Performance Serial Bus) (hereinafter, simply referred to as "1394").

In 1394, the network is initialized so that communication nodes form parent-child relationships according to the positional relation on the network. Therefore, a path to a root node in charge of arbitration is uniquely determined. In other words, the 1394 network has a directed graph. Moreover, in 1394, it is possible to dynamically assign a node number, a unique address, to each communication node based on the parent-child relationships. This method is specifically described in, e.g., International Application No. PCT/US93/12314 titled "Method and Apparatus for Unique Address Assignment, Node Self-Identification and Topology Mapping for a Directed Acyclic Graph".

According to this method, the network must be initialized so that a path to each communication node is uniquely determined. In other words, the entire network or a part of the network must not form a loop. If a loop is formed on the network, it must be disconnected in some way.

In 1394, if there is any loop on the network, initialization of the network will not be completed within a prescribed period. In such a case, a bit indicating the presence of the loop is set in an internal register in order to warn the user of the presence of the loop. Another method is described in International Application No. PCT/US93/12317 titled "Method and Apparatus for Transforming an Arbitrary Topology Collection of Nodes into an Acyclic Directed Graph".

In "P1394b Draft Standard for a High Performance Serial Bus", it is determined whether a loop is formed by connection of a signal cable or not. If a loop is formed, it is disconnected by logically ignoring connection of the signal cable. Hereinafter, this operation will be described with reference to FIG. 7.

Referring to FIG. 7, the routine is started in step 300. If communication nodes detect new connection of a signal cable in step 301 (YES in step 301), they conduct arbitration in step 302. The arbitration result is then determined in step 303. A communication node that won the arbitration becomes a test initiator. However, a communication node that lost the arbitration becomes a test target.

In step 304, the test initiator transmits a loop test packet (hereinafter, referred to as "LTP") to active ports and transmits a loop test signal (hereinafter, referred to as "LTS") to the port where the connection was detected. In step 308, the test target transmits an LTS to the port where the connection was detected. In other words, the test initiator and the test target are each receiving the LTS from the other. Both LTP and LTS have information identifying the communication node that transmits LTP and LTS, respectively.

The test initiator waits until a prescribed time has passed in step 305 or until the content of the LTS transmitted from the test target matches the content of the LTP transmitted from the test initiator in step 306.

When the test target receives the LTP in step 309 (YES in step 309), it changes the content of the LTS that is being transmitted therefrom to the same content as that of the received LTP in step 310. In step 311, the test target determines whether a prescribed time has passed or not. The test target continuously transmits the LTS during the prescribed time.

If the content of the LTS transmitted from the test target matches that of the LTP transmitted from the test initiator in step 306 (YES in step 306), the test initiator determines that a loop is formed. The test initiator then disconnects the loop by disabling the finally detected connection of a signal cable, that is, connection of a signal cable that triggers this loop disconnection process.

As has been described above, a loop that is accidentally formed on a bus by the user is conventionally disconnected by the above methods.

In the conventional methods, however, the loop is disconnected at a port where connection of a signal cable was finally detected. In other words, the loop is disconnected by disabling operation of that port. Since the loop is disconnected at a fixed point, the best signal transfer efficiency can not necessarily be implemented on the network.

SUMMARY OF THE INVENTION

It is an object of the present invention to provide a loop disconnecting method in view of signal transfer efficiency on a network, in which a loop is disconnected at a suitable one of the ports of communication nodes forming the loop.

In order to achieve the above object, according to the present invention, loop disconnection operation is conducted as follows: if a loop is formed accidentally, information of the ports of communication nodes forming the loop is efficiently collected, and a suitable disconnection point of the loop is obtained from the collected information. The loop is then disconnected at that point.

According to a first aspect of the present invention, in a method for optimizing a bus on a network including a plurality of communication nodes each having a plurality of ports, the plurality of ports of each communication node are connected to ports of other communication nodes through corresponding signal cables on a one-to-one basis so as to allow each communication node to receive and transmit a signal from and to an adjacent communication node. The method includes the steps of circulating a loop test signal from communication node to communication node when new connection of a signal cable is detected, and adding information of a candidate port for disconnecting a loop or information of a port that is suitable for disconnecting the loop to the loop test signal when the loop test signal is circulated.

According to a second aspect of the present invention, in a method for optimizing a bus on a network including a plurality of communication nodes each having a plurality of ports, the plurality of ports of each communication node are connected to ports of other communication nodes through corresponding signal cables on a one-to-one basis so as to allow each communication node to receive and transmit a signal from and to an adjacent communication node. The method includes: a step of causing one of two communication nodes to be a test initiator and the other to be a test target when new connection of a signal cable is detected between the two communication nodes; a transmitting step where the test initiator adds information of a connected port, a port where connection of the signal cable was detected, to a loop test signal and transmits the resultant loop test signal to another communication node from a port other than the connected port; a repeating step where a communication node having a received port, a port that received the loop test signal, adds the information of the receiving port to the loop test signal and transfers the resultant loop test signal to another communication node from a port other than the receiving port; a step of detecting generation of a loop based on the received loop test signal; a step of determining, when the loop is detected in the detecting step, a port for disconnecting the loop, based on the port information added to the loop test signal; and a step of outputting a disconnection instruction signal for inactivating a port to a communication node having the port determined in the determining step.

Preferably, in the repeating step, a signal including the information of the receiving port is coupled to the received loop test signal.

Preferably, the loop test signal has a field for storing a node number, a port number and port information. In the repeating step, the information of the receiving port is compared with the port information stored in the field of the loop test signal. When the receiving port is more preferable for disconnecting the loop, the node number, port number and port information stored in the field are replaced with a node number of a communication node having the receiving port, a port number of the receiving port and information of the receiving port, and the resultant loop test signal is transmitted to another communication node from a port other than the receiving port.

Preferably, in the transmitting step, the test initiator holds a right to use the bus even after the test initiator transmits the loop test signal. In the instruction outputting step, the test initiator abandons the right to use the bus after the test initiator outputs the disconnection instruction signal.

Preferably, the port information is a maximum transfer rate resulting from negotiation between at least one of the plurality of ports and a port or ports to which the at least one port is connected.

According to a third aspect of the present invention, a communication node has a plurality of ports being connected to ports of a plurality of other communication nodes through corresponding signal cables on a one-to-one basis, and transmits and receives a loop test signal having port information added thereto to and from another communication node in response to detection of new connection of a signal cable. The communication node includes a node control section, a decode section, a loop disconnecting section, a port information memory, a signal generating section, and an output signal generating section. The node control section detects new connection of the signal cable and conducts arbitration in order to transmit a loop test signal. The decode section receives the loop test signal having the port information added thereto at any of the plurality of ports, and decodes the received loop test signal. The loop disconnecting section causes the communication node to be a test target if the communication node receives the loop test signal after losing the arbitration, and causes the communication node to be a test initiator if the communication node won the arbitration. The loop disconnecting section outputs a first signal generation instruction if the communication node is the test target, and outputs a second signal generation instruction if the communication node is the test initiator. If the communication node receives the loop test signal which the communication node itself transmitted after becoming the test initiator, the loop disconnecting section specifies a suitable disconnection point of the loop from the port information added to the received loop test signal, and outputs a third signal generation instruction. The port information memory stores port information determined upon initializing a bus. The signal generating section generates a signal in response to the first signal generation instruction, the second signal generation instruction and the third signal generation instruction. More specifically, in response to the first signal generation instruction, the signal generating section generates a loop test signal having information of a port that received the loop test signal, that is, a receiving port, based on the information from the port information memory. In response to the second signal generation instruction, the signal generating section generates a loop test signal having information of a port where the new connection was detected. In response to the third signal generation instruction, the signal generating section generates a disconnection instruction signal for disconnecting the loop at the suitable disconnection point. The output signal generating section selects either the loop test signal having the port information added thereto which is received from the decode section or the signal generated by the signal generating section.

Preferably, the loop test signal generated by the signal generating section in response to the first signal generation instruction is a port information signal having only the information of the receiving port and having a shorter data length than the loop test signal.

According to a fourth aspect of the present invention, a communication node has a plurality of ports being connected to ports of a plurality of other communication nodes through corresponding signal cables on a one-to-one basis, and transmits and receives a loop test signal having port information added thereto to and from another communication node in response to detection of new connection of a signal cable. The communication node includes a node control section, a decode section, a loop disconnecting section, a comparator and an output signal generating section. The node control section detects new connection of the signal cable and conducts arbitration in order to transmit a loop test signal. The decode section receives the loop test signal having the port information added thereto at any of the plurality of ports, and decodes the received loop test signal. The loop disconnecting section causes the communication node to be a test target if the communication node receives the loop test signal after losing the arbitration, and causes the communication node to be a test initiator if the communication node won the arbitration. The loop disconnecting section outputs an enable signal and a first signal generation instruction if the communication node is the test target, and outputs a second signal generation instruction if the communication node is the test initiator. If the communication node receives the loop test signal which the communication node itself transmitted after becoming the test initiator, the loop disconnecting section determines the port information included in the received loop test signal as a suitable disconnection point of a loop and outputs a third signal generation instruction. In response to the enable signal, the comparator compares the port information in the loop test signal decoded by the decode section with information of a port that received the loop test signal, that is, a receiving port, and determines which port information is more preferable for disconnection of the loop. The output signal generating section outputs or generates a signal in response to the first signal generation instruction, the second signal generation instruction and the third signal generation instruction. More specifically, in response to the first signal generation instruction, the output signal generating section receives the determination result of the comparator. When the port information in the loop test signal is more preferable for disconnection of the loop, the output signal generating section outputs the loop test signal having the port information to another communication node. When the information of the receiving port is more preferable for disconnection of the loop, the output signal generating section replaces the port information in the loop test signal with the information of the receiving port so as to generate an updated loop test signal. In response to the second signal generation instruction, the output signal generating section generates a loop test signal having information of a port where the new connection was detected. In response to the third signal generating instruction, the output signal generating section generates a disconnection instruction signal for disconnecting the loop at the suitable disconnection point.

Preferably, in the third and fourth aspects of the present invention, the port information is a maximum transfer rate resulting from negotiation between at least one of the plurality of ports and a port or ports to which the at least one port is connected.

According to the present invention, when a signal cable is connected to a communication node, the communication node adds information of a port to which the signal cable is connected (e.g., transfer rate between ports) to a loop test signal, and transmits the resultant loop test signal to another communication node. In response to this loop test signal, another communication node adds information of a port that received the loop test signal to the received loop test signal, and transmits the resultant loop test signal to still another communication node. Alternatively, another communication node compares port information included in the received loop test signal with information of its own port that received the loop test signal, and adds either the former or latter port information to the loop test signal as port information suitable for disconnection of a loop, and then transmits the resultant loop test signal to still another communication node. Other communication nodes sequentially conduct the above operation in response to the loop test signal.

If the communication node that originally transmitted the loop test signal finally receives the loop test signal, that is, if it is determined that a loop is formed accidentally, this communication node can specify a port that is suitable for disconnection of the loop based on the port information added to the loop test signal. In this way, the loop can be disconnected while maintaining high signal transfer efficiency on the network.

BRIEF DESCRIPTION OF THE DRAWINGS

FIG. 4 shows the structure of a communication node according to a second embodiment of the present invention;

FIG. 5 is a flowchart illustrating a process flow of the communication node of the second embodiment;

FIG. 7 is a flowchart illustrating a process flow of a conventional communication node.

DESCRIPTION OF THE PREFERRED EMBODIMENTS

Hereinafter, preferred embodiments of the present invention will be described in conjunction with the accompanying drawings.

First Embodiment

Figure 1:
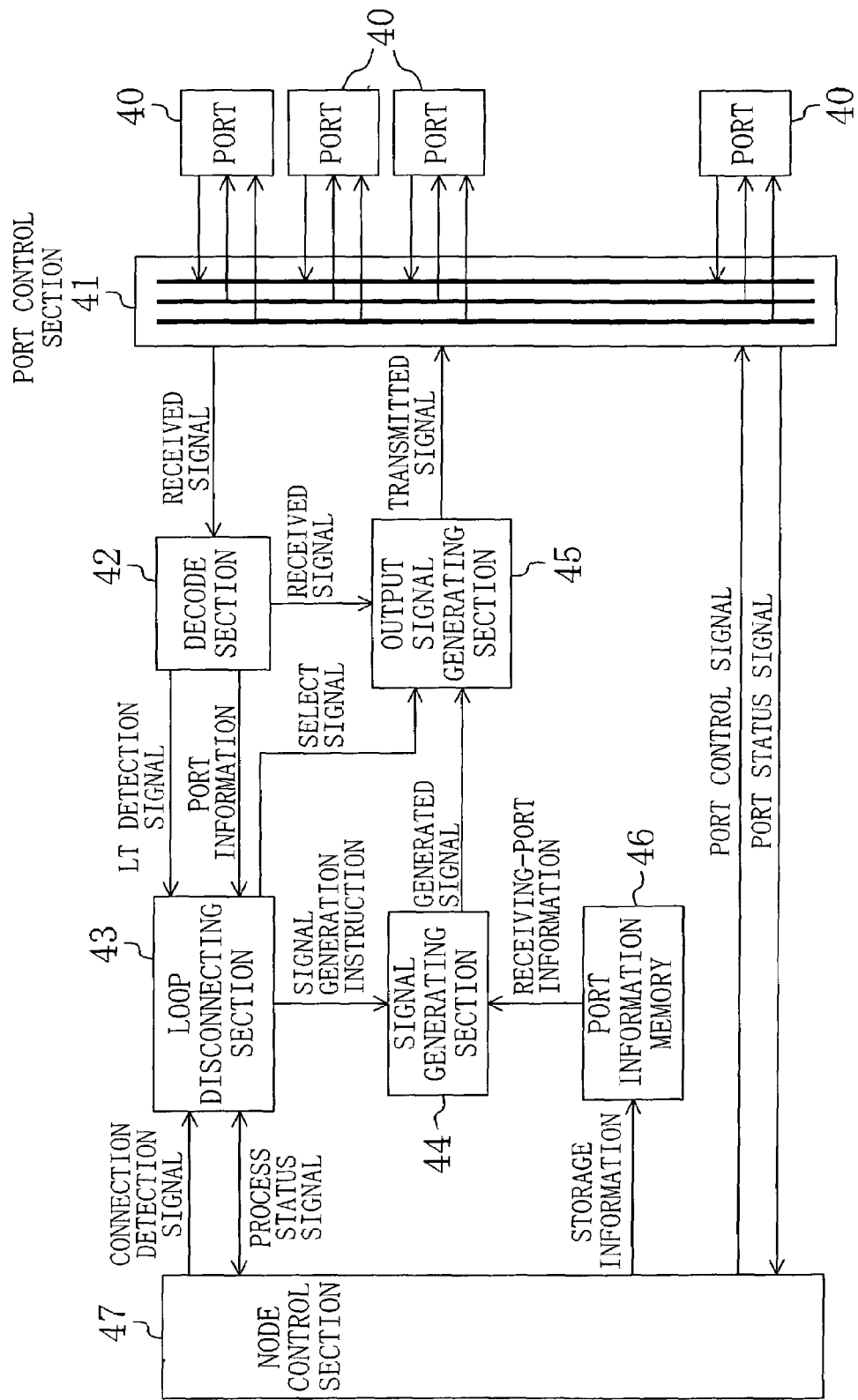
FIG. 1 shows the structure of a communication node according to a first embodiment of the present invention.
Figure 2:
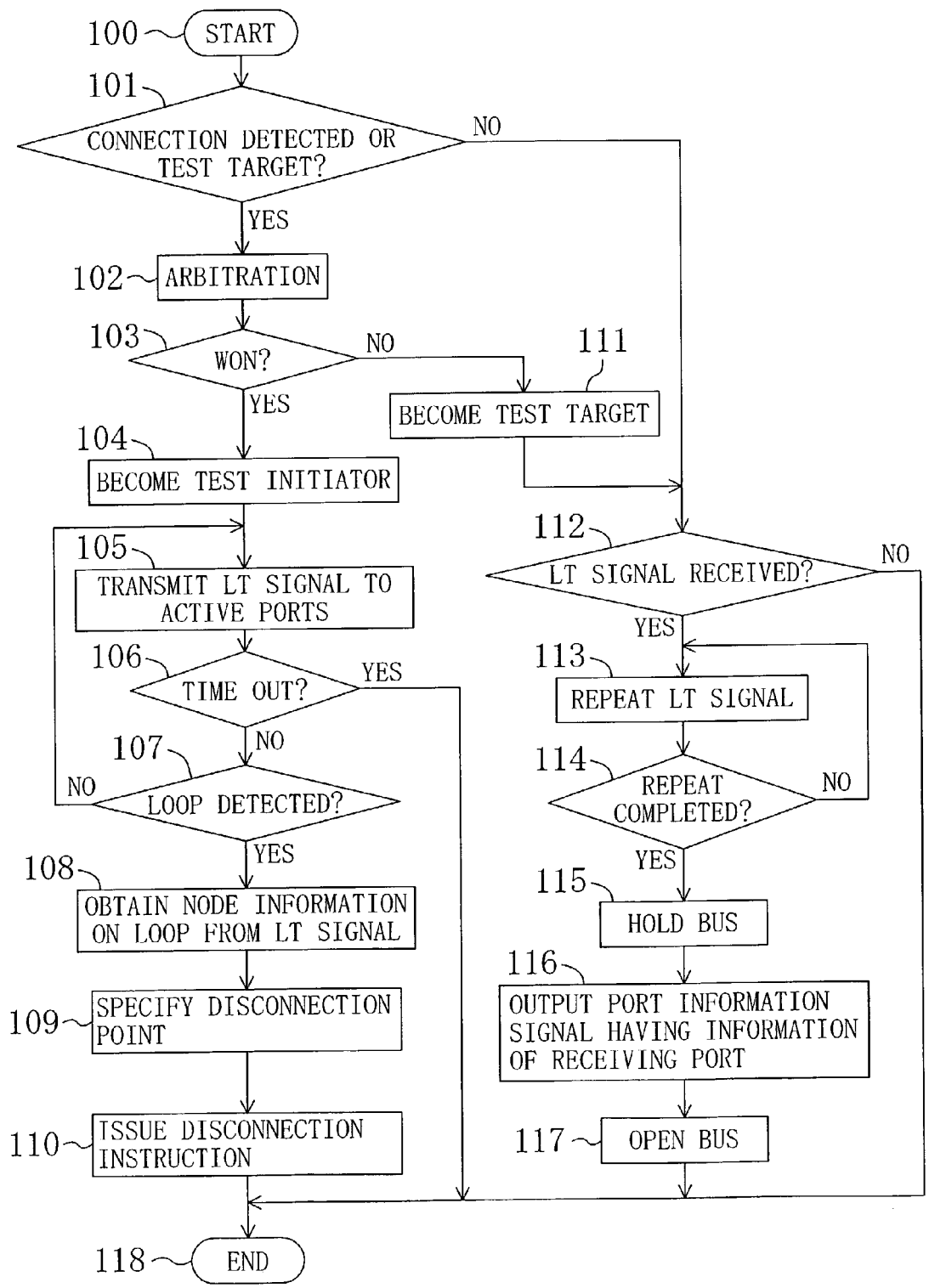
FIG. 2 is a flowchart illustrating a process flow of the communication node of the first embodiment.

FIGS. 1 and 2 show the configuration of the first embodiment of the present invention. FIG. 1 shows the structure of a communication node of the first embodiment.

Referring to FIG. 1, a plurality of ports 40 for receiving and transmitting a signal are each connected to a port of another communication node via a signal cable. A node control section 47 controls the overall operation of the communication node. A port control section 41 controls signal transmission and reception at each port 40 according to a port control signal from the node control section 47, and outputs a port status signal, a signal indicating connection state of each port 40 and the like, to the node control section 47.

A signal received at each port 40 is applied to a decode section 42 through the port control section 41. The decode section 42 analyzes the received signal and determines whether the received signal is a loop test signal (hereinafter, referred to as "LT signal") or not. If the received signal is an LT signal, the decode section 42 outputs an LT detection signal, and also recognizes port information following the LT signal for output. A loop disconnecting section 43 receives the LT detection signal and the port information from the decode section 42 and a connection detection signal from the node control section 47, and outputs a signal generation instruction and a select signal that are required for a loop disconnection process. The connection detection signal is output from the node control section 47 when the node control section 47 detects new connection of a signal cable.

A port information memory 46 holds information of each port 40 of the communication node. A signal generating section 44 generates a signal in response to the signal generation instruction from the loop disconnecting section 43. More specifically, the signal generating section 44 generates an LT signal when a new signal cable is connected to any of the ports 40 of the communication node. In the case where the decode section 42 detected an LT signal, the signal generation section 44 generates a port information signal to be added to the LT signal, based on the port information from the port information memory 46. An output signal generating section 45 receives the signal received by the decode section 42, and also receives the LT signal or port information signal from the signal generating section 44. The output signal generating section 45 then selects either the received signal from the decode section 42 or the LT signal or port information signal from the signal generating section 44 according to the select signal from the loop disconnecting section 43, and transmits the selected signal to signal cables through the port control section 41 and the ports 40.

Hereinafter, operation of the communication node of the present embodiment will be described in detail with reference to FIG. 2. FIG. 2 is a flowchart illustrating operation associated with a loop disconnection process of the communication node.

Referring to FIG. 2, the communication node always repeatedly conducts steps 100 to 118. The routine starts with step 100. In step 101, the communication node determines whether a signal cable is connected to, a port to which no signal cable has been connected. Each port 40 monitors its own state, and the port control section 41 notifies the node control section 47 of the states of all ports 40 by sending a port status signal thereto. Therefore, the connection state of the ports 40 can be known by the port status signal. In step 101, the communication node also examines whether it is a test target or not. The expression "the communication node is a test target" means that, although the communication node had detected connection of a signal cable before, it lost the arbitration and was not able to transmit an LT signal for the loop disconnection process. In other words, it means that a loop to be disconnected may be left untreated. If the node control section 47 detects new connection of a signal cable according to the port status signal or detects that the communication node is a test target (YES in step 101), it outputs a connection detection signal, and the routine proceeds to step 102. If there is no new connection of a signal cable (NO in step 101), the routine proceeds to step 112.

In step 102, the communication node conducts arbitration in order to output the LT signal. Any communication protocol may be used for the arbitration. For simplicity of description, it is herein assumed that the arbitration is conducted according to the IEEE1394 protocol.

In step 103, it is determined whether the communication node won the arbitration or not. The arbitration is conducted by the node control section 47, and the node control section 47 notifies the loop disconnecting section 43 of the arbitration result by transmitting a process status signal thereto. If the communication node won the arbitration (YES in step 103), the loop disconnecting section 43 outputs a signal generation instruction having a first value and a select signal having a first value. At the same time, the loop disconnecting section 43 outputs to the node control section 47 a process status signal indicating that the loop disconnection process is going on. The communication node becomes a test initiator in step 104, and the routine then proceeds to step 105.

If the communication node lost the arbitration (NO in step 103), it becomes a test target in step 111, and the routine proceeds to step 112. In this case, the loop disconnecting section 43 discontinues the loop disconnection process and waits until the communication node receives an LT signal or until the node control section 47 conducts arbitration again and the communication node wins the arbitration.

[Operation of Test Initiator]

Hereinafter, operation of the test initiator will be described.

In step 105, the signal generating section 44 receives the signal generation instruction having the first value (second signal generation instruction) and generates an LT signal. The LT signal is required to include at least an identifier indicating that the signal is an LT signal, information of the port to which a signal cable is connected this time (hereinafter, sometimes referred to as "connected port"), a port number thereof, and a node number of a communication node having the connected port.

The information of the port is obtained from the port information memory 46. The information of the port may include various kinds of information such as maximum transfer rate of the port, transfer rate between ports resulting from negotiation with a port to which the port is connected, bus width, transfer priority, and power supply capability.

Once connection of the signal cable is detected, the node control section 47 stores required information of the above port information in the port information memory 46 by the time the loop disconnection process is started.

In the following description, it is assumed that the transfer rate between ports resulting from negotiation with a port to which the port is connected is used as the information of the port. It is also assumed that the lower the transfer rate is, the more preferable the port is determined to be as a disconnection point of the loop.

In step 105, the output signal generating section 45 receives the select signal having the first value. Therefore, the output signal generating section 45 outputs the LT signal received from the signal generating section 44 to the port control section 41. At the same time, the node control section 47 outputs a port control signal to the port control section 41 so that the port control section 41 transmits the LT signal to all active ports but the port where connection of the signal cable was detected. In response to the port control signal, the port control section 41 transmits the LT signal from all active ports but the port where connection of the signal cable was detected. After transmission of the LT signal is completed, the routine proceeds to step 106.

In step 106, the time that has passed since the output signal generating section 45 output the LT signal is measured, and it is determined whether a prescribed time has passed or not. In step 107, it is determined whether a loop was detected or not. In other words, it is determined whether or not a loop was detected within the prescribed time after the output signal generating section 45 output the LT signal. If a loop was detected (YES in step 107), the routine proceeds to step 108. Otherwise (NO in step 107 and then YES in step 106), the routine proceeds to step 118.

The loop detection method in step 107 will now be described. If a loop is formed on the network, the LT signal transmitted from the test initiator should return to the test initiator. When the communication node receives a signal from another communication node, the decode section 42 analyzes the content of the received signal and outputs port information as the analysis result. The loop disconnecting section 43 then examines whether or not the content of the received signal matches the LT signal it transmitted. If the content matches the LT signal, the loop disconnecting section 43 detects the loop by considering that the loop is formed.

The loop detection method is not limited to the above method. For example, like P1394b in the conventional example, two kinds of loop test signals, LTP and LTS, may be used so that both the test initiator and the test target can detect the loop.

If the loop is detected (YES in step 107), the routine proceeds to step 108. In step 108, the decode section 42 analyzes a port information signal following the LT signal, and notifies the loop disconnecting section 43 of the port information included in the port information signal and the LT signal. In step 109, the loop disconnecting section 43 selects from the received port information the most suitable port information for disconnecting the loop, and specifies the node number n and port number m of the communication node having the selected port information.

In step 110, an instruction to inactivate the port of the port number m is transmitted to the communication node of the node number n. A signal including this instruction is herein referred to as "disconnection instruction signal". The disconnection instruction signal is generated by the signal generating section 44 in response to a third signal generation instruction from the loop disconnecting section 43.

Common communication protocols such as EEE1394 and P1394b have a function to inactivate an arbitrary port of an arbitrary communication node for power saving. In other words, provided that the loop disconnecting section 43 notifies the node control section 47 of the node number n and port number m by sending a process status signal thereto, the loop disconnection operation in step 110 can be easily implemented by using the above function of the common protocols.

After the instruction to inactivate the port is transmitted, the routine proceeds to step 118, whereby operation of the test initiator is completed.

[Operation of Test Target and Other Communication Nodes]

Hereinafter, operation of the test target and other communication nodes will be described.

If the communication node lost the arbitration in step 103 (NO in step 103), it becomes a test target in step 111 and conducts step 112 and the following steps. Every communication node where connection of a signal cable was not detected in step 101 (NO in step 101) conducts step 112 and the following steps as a normal communication node which is neither a test initiator nor a test target.

When the communication node receives a signal from another communication node, the decode section 42 analyzes the received signal and determines whether the received signal is an LT signal or not in step 112. If the received signal is an LT signal (YES in step 112), the decode section 42 asserts an LT detection signal, and the routine proceeds to step 113. Otherwise (NO in step 112), the routine proceeds to step 118.

In step 113, the loop disconnecting section 43 receives the LT detection signal and outputs a select signal having a second value. The output signal generating section 45 receives the select signal having the second value, and outputs the LT signal received from the decode section 42. The node control section 47 has already recognized the port that received the LT signal, based on the port status signal (hereinafter, the port that received the LT signal is sometimes referred to as "receiving port"). The node control section 47 therefore outputs a port control signal to the port control section 41 so that the port control section 41 transmits the LT signal received from the output signal generating section 45 to all ports but the receiving port. Accordingly, the communication node transfers the received LT signal to the active ports other than the receiving port.

Thereafter, it is determined in step 114 whether the transfer of the LT signal has been completed or not. The transfer of the LT signal is continued until reception of the LT signal is completed. The decode section 42 continuously asserts the LT detection signal as long as it receives the LT signal. Therefore, completion of the transfer can be detected based on negation of the LT detection signal.

After the transfer of the LT signal is completed (YES in step 114), a bus is held in step 115. Since the communication node wants to transmit a port information signal after transferring the received LT signal, it is necessary to hold the bus in order to prevent another communication node from starting transmission of a signal. The bus is held right after the transfer of the LT signal is completed, and will not be released until transmission of the port information signal is completed.

Once the LT detection signal is negated in response to completion of the transfer of the LT signal, the loop disconnecting section 43 outputs a select signal having a first value and a signal generation instruction having a second value (first signal generation instruction), and the routine proceeds to step 116.

In step 116, the signal generating section 44 receives the signal generation instruction having the second value from the loop disconnecting section 43, and generates a port information signal. The output signal generating section 45 receives the select signal having the first value from the loop disconnecting section 43, and outputs the port information signal received from the signal generating section 44. As a result, the LT signal and the port information signal are output to the signal cable in succession.

After outputting of the port information signal is completed, the bus is released in step 117. The routine then proceeds to step 118, whereby operation of the test target and other communication nodes is completed.

[Overall Operation of Network]

FIGS. 3A to 3F illustrate the loop disconnection operation of the present embodiment at the network level. In the figures, each white circle represents a communication node, and the figure in each white circle indicates a node number. Each black circle represents a port of a corresponding communication node, and the figure after symbol "#" indicates a port number. Each line represents a signal cable.

In the figures, 61 denotes an LT signal transmitted from communication node 0, 62 denotes a port information signal generated by communication node 2, 63 denotes a port information signal generated by communication node 1, and 64 denotes a disconnection instruction signal. Regarding the LT signal 61, port information signals 62, 63 and disconnection instruction signal 64, the figures in parentheses respectively represent the node number and port number of a communication node which is a source of the port information included in that signal.

Figure 3A:
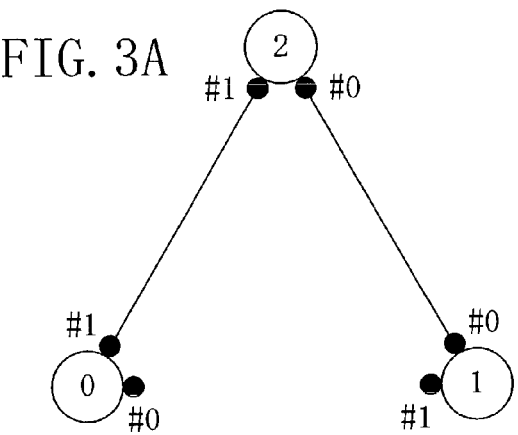
FIGS. 3A, 3B, 3C, 3D, 3E and 3F illustrate operation of a network including the communication nodes of the first embodiment.

FIG. 3A shows the initial state of the network. In this state, ports 1 of communication nodes 0, 2 are connected to each other through a signal cable, and ports 0 of communication nodes 1, 2 are connected to each other through a signal cable. However, communication nodes 0, 1 are not connected to each other through a signal cable. The following description is given on the assumption that port 0 of communication node 0 and port 1 of communication node 1 are additionally connected to each other through a signal cable.

Figure 3B:
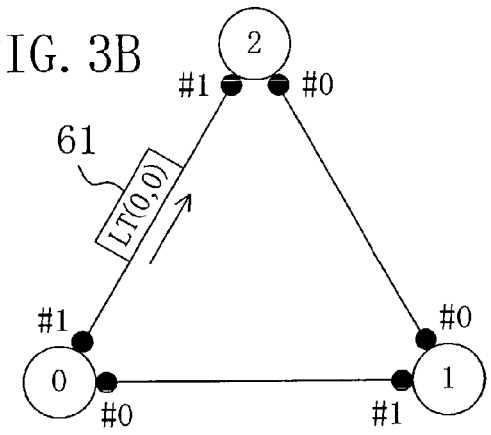

When port 0 of communication node 0 and port 1 of communication node 1 are connected to each other through a signal cable, communication nodes 0, 1 detect the connection and conduct arbitration. It is herein assumed that communication node 0 won the arbitration and communication node 1 lost the arbitration. In other words, communication node 0 becomes a test initiator and communication node 1 becomes a test target. Since communication node 0 won the arbitration, it outputs an LT signal 61 to its active port 1. This state is shown in FIG. 3B. Since port 0 of communication node 0 is a connected node, the LT signal has port information indicating communication node 0 and port 0.

Figure 3C:
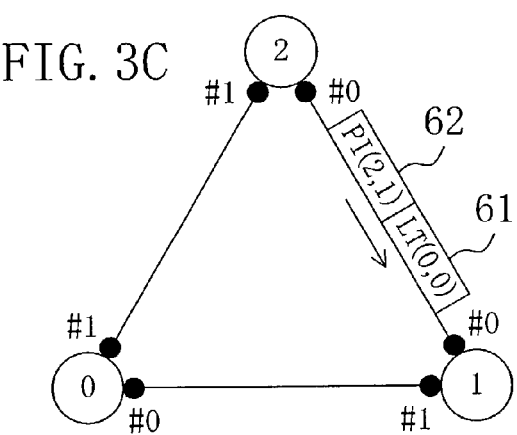

FIG. 3C shows the state of the network in the case where communication node 2 received the LT signal 61. When communication node 2 receives the LT signal 61, it transfers the received LT signal 61 to its active port 0. After the transfer is completed, communication node 2 transmits a port instruction signal 62 before the bus is released. Since communication node 2 received the LT signal 61 at port 1, the port information signal has port information indicating communication node 2 and port 1.

Figure 3D:
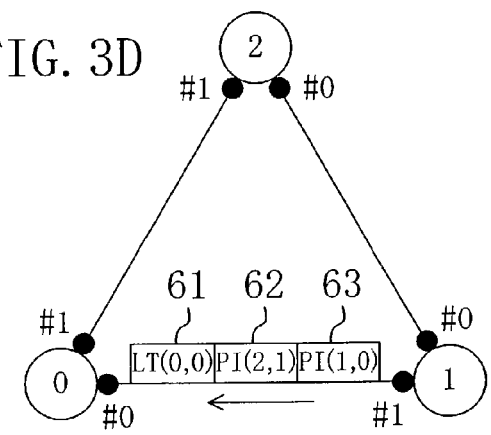

FIG. 3D shows the state of the network in the case where communication node 1 received the LT signal 61. When communication node 1 receives the LT signal 61, it transfers the received LT signal 61 to its active port 1. After communication node 1 finishes transferring the LT signal 61 and the port information signal 62, it successively transmits its own port information signal 63 like communication node 2. Since communication node 1 received the LT signal 61 at port 0, the port information signal 63 has port information indicating communication node 1 and port 0.

Figure 3E:
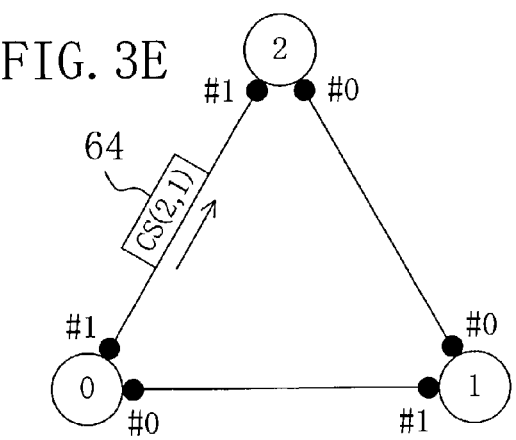
Figure 3F:
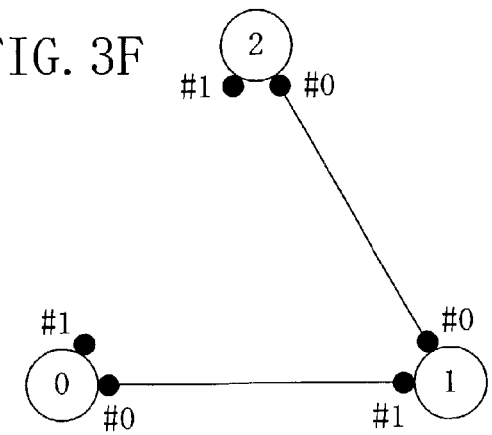

Communication node 0 then receives the LT signal 61 it transmitted. As a result, communication node 0 recognizes that a loop is formed on the network, and obtains an optimal disconnection point of the loop from the port information having the LT signal 61 and the port information signals 62, 63. It is herein assumed that connection between communication nodes 0, 2 is the optimal disconnection point. In this case, as shown in FIG. 3E, communication node 0 transmits a disconnection instruction signal 64 to communication node 2 so that communication node 2 inactivates its port 1. In response to the disconnection instruction signal 64, communication node 2 inactivates the designated port (in this example, port 1). The resultant connection state of the network is shown in FIG. 3F.

Note that the port information signal may have the same format as that of the LT signal. However, since the port information signal is always transmitted together with the LT signal, information indicating that the signal is an LT signal is redundant. Eliminating this redundant part from the format would enable reduction in the total signal length that is transmitted in the loop disconnection operation, and thus enable reduction in processing time correspondingly.

Second Embodiment

Hereinafter, the second embodiment of the present invention will be described with reference to FIGS. 4 and 5.

FIG. 4 shows the structure of a communication node according to the present embodiment. Referring to FIG. 4, a plurality of ports 50 for receiving and transmitting a signal are each connected to a port of another communication node via a signal cable. A node control section 57 controls the overall operation of the communication node. A port control section 51 controls signal transmission and reception at each port 50 according to a port control signal from the node control section 57, and outputs a port status signal, a signal indicating connection state of each port 50 and the like, to the node control section 57.

A signal received at each port 50 is applied to a decode section 52 through the port control section 51. The decode section 52 analyzes the received signal and determines whether the received signal is an LT signal or not. If the received signal is an LT signal, the decode section 52 outputs an LT detection signal, and also recognizes port information included in the LT signal for output. A loop disconnecting section 53 receives the LT detection signal and the port information from the decode section 52 and a connection detection signal from the node control section 57, and outputs a signal generation instruction and an enable signal that are required for a loop disconnection process. The connection detection signal is output from the node control section 57 when the node control section 57 detects new connection of a signal cable.

A port information memory 56 holds information of each port 50 of the communication node. In response to the enable signal from the loop disconnecting section 53, a comparator 54 compares the port information included in the LT signal, that is, the port information extracted by the decode section 52, with the port information from the port information memory 56, that is, information of a port of the communication node which received the LT signal (i.e., receiving port). Based on the comparison, the comparator 54 determines which port information is preferable for the loop disconnection operation, and outputs the comparison result.

An output signal generating section 55 receives the signal received by the decode section 52, and also receives the comparison result signal from the comparator 54.

According to the comparison result, the output signal generating section 55 transmits the signal received from the decode section 52, that is, the port information included in the LT signal, to signal cables through the port control section 51 and the ports 50. Alternatively, the output signal generating section 55 replaces the port information included in the LT signal with information of the receiving port of the communication node, and transmits the resultant signal sequence to the signal cables through the port control section 51 and the ports 50. If the communication node becomes a test initiator, the output signal generating section 55 outputs the LT signal.

Hereinafter, operation of the communication node of the present embodiment will be described in detail with reference to FIG. 5. FIG. 5 is a flowchart illustrating operation associated with a loop disconnection process of the communication node.

Referring to FIG. 5, the communication node always repeatedly conducts steps 200 to 218. The routine starts with step 200. In step 201, the communication node determines whether a signal cable is connected to a port to which no signal cable has been connected. Each port 50 monitors its own state, and the port control section 51 notifies the node control section 57 of the states of all ports 50 by sending a port status signal thereto. Therefore, the connection state of the ports 50 can be known by the port status signal. In step 201, the communication node also examines whether it is a test target or not. The expression "the communication node is a test target" means that, although the communication node had detected connection of a signal cable before, it lost the arbitration and was not able to transmit an LT signal for the loop disconnection process. In other words, it means that a loop to be disconnected may be left untreated. If the node control section 57 detects new connection of a signal cable according to the port status signal or detects that the communication node is a test target (YES in step 201), it outputs a connection detection signal to the loop disconnecting section 53, and the routine proceeds to step 202. If there is no new connection of a signal cable (NO in step 201), the routine proceeds to step 212.

In step 202, the communication node conducts arbitration in order to output the LT signal. Any communication protocol may be used for the arbitration. For simplicity of description, it is herein assumed that the arbitration is conducted according to the IEEE1394 protocol as in the first embodiment.

In step 203, it is determined whether the communication node won the arbitration or not. The arbitration is conducted by the node control section 57, and the node control section 57 notifies the loop disconnecting section 53 of the arbitration result by transmitting a process status signal thereto. If the communication node won the arbitration (YES in step 203), the loop disconnecting section 53 asserts a signal generation instruction and an enable signal. At the same time, the loop disconnecting section 53 outputs to the node control section 57 a process status signal indicating that the loop disconnection process is going on. The communication node becomes a test initiator in step 204, and the routine then proceeds to step 205.

If the communication node lost the arbitration (NO in step 203), it becomes a test target in step 211, and the routine proceeds to step 212. In this case, the loop disconnecting section 53 discontinues the loop disconnection process and waits until the communication node receives an LT signal or until the node control section 57 conducts arbitration again and the communication node wins the arbitration.

[Operation of Test Initiator]

Hereinafter, operation of the test initiator will be described.

In step 205, the comparator 205 compares the port information from the decode section 52 with port information from the port information memory 56, i.e., information of the connected port, in response to assertion of the enable signal. Since the communication node no longer receives the LT signal, the port information is no longer output from the decode section 52. Accordingly, the comparator 54 outputs a first value as the comparison result.

The output signal generating section 55 generates an LT signal in response to assertion of the signal generation instruction (second signal generation instruction). The LT signal is required to include at least an identifier indicating that the signal is an LT signal, a node number of a communication node that originally transmitted the LT signal, information of the port to which a signal cable is connected this time (i.e., connected port), a port number thereof, and a node number of a communication node having the connected port. The information of the port is the same as that described in the first embodiment.

In step 205, the output signal generating section 55 receives the first value from the comparator 54 as the comparison result. Therefore, the output signal generating section 55 outputs the LT signal it generated to the port control section 51. At the same time, the node control section 57 outputs a port control signal to the port control section 51 so that the port control section 51 transmits the LT signal to all active ports but the port where connection of the signal cable was detected. In response to the port control signal, the port control section 51 transmits the LT signal from all active ports but the port where connection of the signal cable was detected. After transmission of the LT signal is completed, the routine proceeds to step 206. The test initiator keeps holding the bus.

In step 206, the time that has passed since the output signal generating section 55 output the LT signal is measured, and it is determined whether a prescribed time has passed or not. In step 207, it is determined whether a loop was detected or not. In other words, it is determined whether or not a loop was detected within the prescribed time after the output signal generating section 55 output the LT signal. If a loop was detected (YES in step 207), the routine proceeds to step 208. Otherwise (NO in step 207 and then YES in step 206), the routine proceeds to step 218. If the bus is held at this point, step 218 must be conducted after the bus is released.

Loop detection in step 207 may be conducted as follows: the communication node compares the node number included in the received LT signal, that is, the node number of a communication node that originally transmitted the LT signal, with the node number of itself If both node numbers are the same, the loop is recognized. However, it should be appreciated that the loop detection method is not limited to this, and the method used in P1394b or the like may alternatively used, as described in connection with step 107 of the first embodiment.

If the loop is detected (YES in step 207), the routine proceeds to step 208. In step 208, the decode section 52 extracts the port information from the LT signal and transmits the extracted port information to the loop disconnecting section 53. In step 209, the loop disconnecting section 53 stores the node number n and port number m within the received port information as an optimal disconnection point.

In step 210, an instruction to inactivate the port of the port number m is transmitted to the communication node of the node number n as a disconnection instruction signal. The disconnection instruction signal is generated by the output signal generating section 55 in response to a third signal generation instruction from the loop disconnecting section 53. As described in the first embodiment, common communication protocols such as IEEE1394 and P1394b have a function to inactivate an arbitrary port of an arbitrary communication node for power saving. In other words, provided that the loop disconnecting section 53 notifies the node control section 57 of the node number n and port number m by sending a process status signal thereto, the loop disconnection operation in step 210 can be easily implemented by using the above function of the common protocols.

If the LT signal is transmitted in step 205 while holding the bus, the bus is released after the instruction to inactivate the port is transmitted. The routine then proceeds to step 218, whereby operation of the test initiator is completed.

[Operation of Test Target and Other Communication Nodes]

Hereinafter, operation of the test target and other communication nodes will be described.

If the communication node lost the arbitration in step 203 (NO in step 203), it becomes a test target in step 211 and conducts step 212 and the following steps. Every communication node where connection of a signal cable was not detected in step 201 (NO in step 201) conducts step 212 and the following steps as a normal communication node which is neither a test initiator nor a test target.

When the communication node receives a signal from another communication node, the decode section 52 analyzes the received signal and determines whether the received signal is an LT signal or not in step 212. If the received signal is not an LT signal (NO in step 212), the routine proceeds to step 218. On the other hand, if the received signal is an LT signal (YES in step 212), the decode section 52 asserts an LT detection signal. In response to assertion of the LT detection signal, the loop disconnecting section 53 asserts an enable signal for the comparator 54 and a signal generation instruction (first signal generation instruction) for the output signal generating section 55.

In step 213, the decode section 52 extracts port information from the LT signal. In step 214, the comparator 54 compares the port information extracted by the decode section 52 (port information included in the received LT signal) with port information read from the port information memory 56 (information of the port that received the LT signal, i.e., receiving port). Based on the comparison, the comparator 54 determines in step 215 which port information is more suitable for loop disconnection. If the information of the receiving port is more suitable, the comparator 54 outputs a comparison result signal having a first value. Otherwise, the comparator 54 outputs a comparison result signal having a second value.

The output signal generating section 55 receives the port information included in the LT signal from the decode section 52. Once the loop disconnecting section 53 asserts the signal generation instruction, the output signal generating section 55 replaces the port information from the decode section 52 with information of the receiving port from the port information memory 56, and generates the LT signal including the thus replaced information of the receiving port as an updated LT signal. If the comparison result signal from the comparator 54 has the first value, the output signal generating section 55 outputs the updated LT signal in step 216. If the comparison result signal has the second value, the output signal generating section 55 outputs in step 217 the LT signal including the port information which is received from the decode section 52. The node control section 57 has already recognized the receiving port based on the port status signal. The node control section 57 therefore outputs a port control signal to the port control section 51 so that the port control section 51 transmits the output signal of the output signal generating section 55 to all ports but the receiving port.

The routine then proceeds to step 218, whereby operation of the test target and other communication nodes is completed.

[Overall Operation of Network]

FIGS. 6A to 6F illustrate the loop disconnection operation of the present embodiment at the network level. In the figures, each white circle represents a communication node, and the figure in each white circle indicates a node number. Each black circle represents a port of a corresponding communication node, and the figure after symbol "#" indicates a port number. Each line represents a signal cable.

In the figures, 71 denotes an LT signal transmitted from communication node 0, 72 denotes a hold signal for holding a bus, 73 denotes an LT signal transmitted from communication node 2, 74 denotes an LT signal transmitted from communication node 1, and 75 denotes a disconnection instruction signal transmitted from communication node 0. Regarding the LT signals 71, 73, 74 and the disconnection instruction signal 75, the figures in parentheses respectively represent the node number and port number of a communication node which is a source of the port information included in that signal.

Figure 6A:
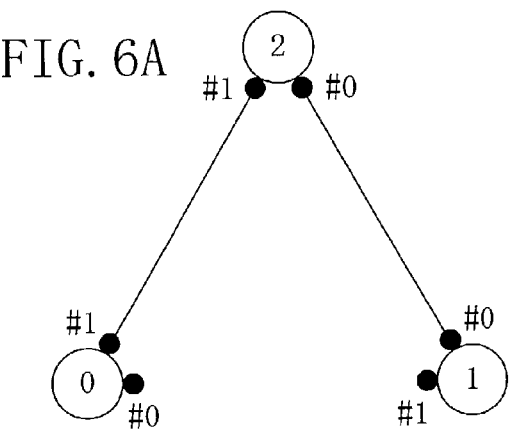
FIGS. 6A, 6B, 6C, 6D, 6E and 6F illustrate operation of a network including the communication nodes of the second embodiment.

FIG. 6A shows the initial state of the network. In this state, ports 1 of communication nodes 0, 2 are connected to each other through a signal cable, and ports 0 of communication nodes 1, 2 are connected to each other through a signal cable. However, communication nodes 0, 1 are not connected to each other through a signal cable. The following description is give on the assumption that port 0 of communication node 0 and port 1 of communication node 1 are additionally connected to each other through a signal cable.

When port 0 of communication node 0 and port 1 of communication node 1 are connected to each other through a signal cable, communication nodes 0, 1 detect the connection and conduct arbitration. It is herein assumed that communication node 0 won the arbitration and communication node 1 lost the arbitration. In other words, communication node 0 becomes a test initiator and communication node 1 becomes a test target.

Figure 6B:
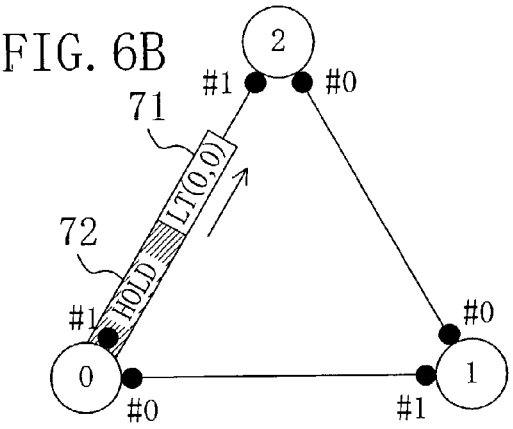

Since communication node 0 won the arbitration, it outputs an LT signal 71 to its active port 1. This state is shown in FIG. 6B. Since port 0 of communication node 0 is a connected node, the LT signal 71 has port information indicating communication node 0 and port 0. Even after transmission of the LT signal 71 is completed, communication node 0 continuously transmits a hold signal 72 to hold the bus. This prevents another communication node from starting the next arbitration.

Figure 6C:
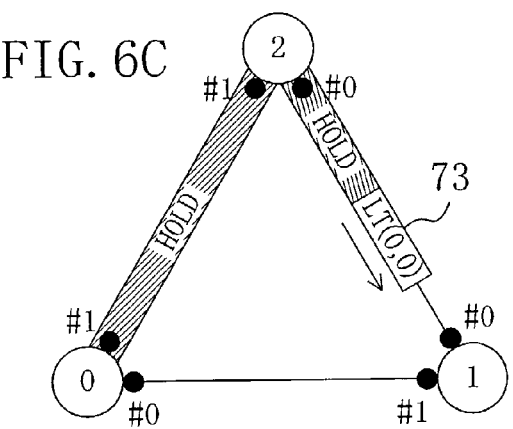

FIG. 6C shows the state of the network in the case where communication node 2 received the LT signal 71. When communication node 2 receives the LT signal 71, it compares port information included in the LT signal 71, that is, information of port 0 of communication node 0, with information of port 1 of communication node 2, that is, information of the port receiving the LT signal 71. It is herein assumed that the information of port 0 of communication node 0 is more suitable for loop disconnection. In this case, communication node 2 does not update the LT signal 71, but outputs an LT signal 73 having the information of port 0 of communication node 0 to its active port 0. Communication node 2 transfers the hold signal 72 following the LT signal 71 to its port 0.

Figure 6D:
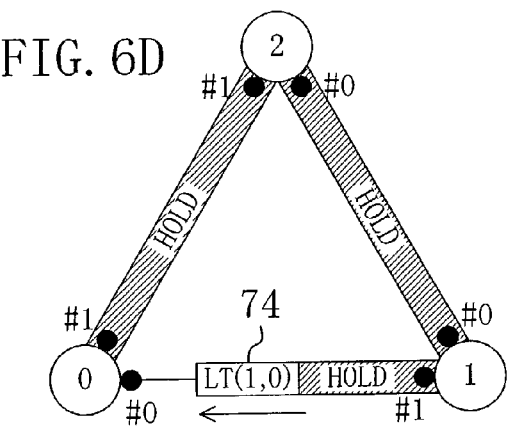

FIG. 6D shows the state of the network in the case where communication node 1 received the LT signal 73. When communication node 1 receives the LT signal 73, it compares port information included in the LT signal 73, that is, information of port 0 of communication node 0, with information of port 0 of communication node 1, that is, information of the port receiving the LT signal 73. It is herein assumed that the information of port 0 of communication node 1 is more suitable for loop disconnection. In this case, communication node 1 generates an LT signal 74 having the information of port 0 of communication node 1, and outputs the LT signal 74 to its active port 1 instead of the received LT signal 73.

Figure 6E:
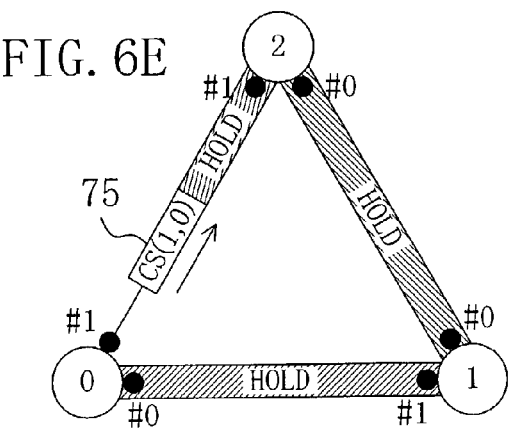

As a result, communication node 0 receives the LT signal 74 it originally transmitted, and thus recognizes formation of a loop on the network. Communication node 0 then extracts the port information from the LT signal 74 and recognizes that the port of the communication node that is indicated by the extracted port information is the optimal disconnection point of the loop. The port information included in the LT signal 74 indicates port 0 of communication node 1. Therefore, as shown in FIG. 6E, communication node 0 transmits a disconnection instruction signal 75 to communication node 1 so that communication node 1 inactivates its port 0.

Figure 6F:
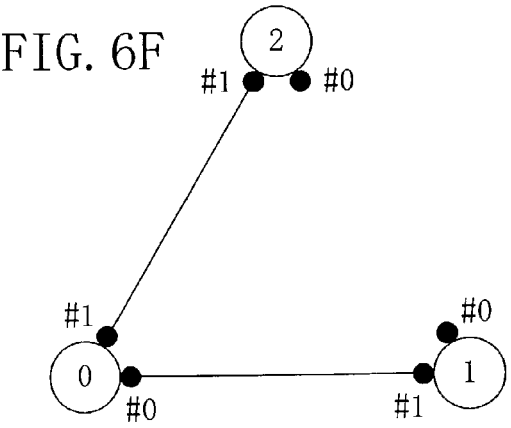

In response to the disconnection instruction signal 75, communication node 1 inactivates the designated port (in this example, port 0). The resultant connection state of the network is shown in FIG. 6F.

Note that "new connection of a signal cable" as described in the first and second embodiments is not limited to physical connection, but includes the case where a port which has a signal cable connected thereto but operation thereof has been discontinued resumes the operation (i.e., logical connection).

In the first and second embodiments, the test target may stop being the test target as soon as it receives the disconnection instruction signal. In this case, the test target will no longer conduct arbitration after the loop is disconnected, thereby enabling reduction in processing time.

What is claimed is:

1. A method for optimizing a bus on a network including a plurality of communication nodes each having a plurality of ports, wherein the plurality of ports of each communication node are connected to ports of other communication nodes through corresponding signal cables on a one-to-one basis so as to allow each communication node to receive and transmit a signal from and to an adjacent communication node, the method comprising:

a step of causing one of two communication nodes to be a test initiator and the other to be a test target when new connection of a signal cable is detected between the two communication nodes;

a transmitting step where the test initiator adds information of a connected port, the connected port where connection of the signal cable was detected, to a loop test signal and transmits the resultant loop test signal to another communication node from a port other than the connected port;

a repeating step where a communication node having a received port, the received port receives the loop test signal, adds the information of the receiving port to the loop test signal and transfers the resultant loop test signal to another communication node from a port other than the receiving port;

a step of detecting generation of a loop based on the received loop test signal;

a step of determining, when the loop is detected in the detecting step, a port for disconnecting the loop, based on the port information added to the loop test signal; and a step of outputting a disconnection instruction signal for inactivating a port to a communication node having the port determined in the determining step, wherein the loop test signal has a field for storing a node number, a port number and port information, in the repeating step, the information of the receiving port is compared with the port information stored in the field of the loop test signal, and when the receiving port is more preferable for disconnecting the loop, the node number, port number and port information stored in the field are replaced with a node number of a communication node having the receiving port, a port number of the receiving port and information of the receiving port, and the resultant loop test signal is transmitted to another communication node from a port other than the receiving port.

2. The method according to claim 1, wherein
in the transmitting step, the test initiator holds a right to use the bus even after the test initiator transmits the loop test signal, and
in the instruction outputting step, the test initiator abandons the right to use the bus after the test initiator outputs the disconnection instruction signal.

3. A communication node having a plurality of ports being connected to ports of a plurality of other communication nodes through corresponding signal cables on a one-to-one basis, for transmitting and receiving a loop test signal having port information added thereto to and from another communication node in response to detection of new connection of a signal cable, comprising:
 a node control section for detecting new connection of the signal cable and conducting arbitration in order to transmit a loop test signal;
 a decode section for receiving the loop test signal having the port information added thereto at any of the plurality of ports, and decoding the received loop test signal;
 a loop disconnecting section for causing the communication node to be a test target if the communication node receives the loop test signal after losing the arbitration, and causing the communication node to be a test initiator if the communication node won the arbitration, wherein the loop disconnecting section outputs an enable signal and a first signal generation instruction if the communication node is the test target, and outputs a second signal generation instruction if the communication node is the test initiator, and if the communication node receives the loop test signal which the communication node itself transmitted after becoming the test initiator, the loop disconnecting section determines the port information included in the received loop test signal as a suitable disconnection point of a loop and outputs a third signal generation instruction;
 a comparator responsive to the enable signal, for comparing the port information in the loop test signal decoded by the decode section with information of a port that received the loop test signal, that is, a receiving port, and determines which port information is more preferable for disconnection of the loop; and
 an output signal generating section for outputting or generating a signal in response to the first signal generation instruction, the second signal generation instruction and the third signal generation instruction as follows: in response to the first signal generation instruction, the output signal generating section receives the determination result of the comparator, wherein when the port information in the loop test signal is more preferable for disconnection of the loop, the output signal generating section outputs the loop test signal having the port information to another communication node, and when the information of the receiving port is more preferable for disconnection of the loop, the output signal generating section replaces the port information in the loop test signal with the information of the receiving port so as to generate an updated loop test signal; in response to the second signal generation instruction, the output signal generating section generates a loop test signal having information of a port where the new connection was detected; and in response to the third signal generating instruction, the output signal generating section generates a disconnection instruction signal for disconnecting the loop at the suitable disconnection point.

4. The communication node according to claim 3, wherein the port information is a maximum transfer rate resulting from negotiation between at least one of the plurality of ports and a port or ports to which the at least one port is connected.

* * * * *